US012743963B2

(12) United States Patent
Yu

(10) Patent No.: US 12,743,963 B2
(45) Date of Patent: Sep. 22, 2026

(54) METHOD AND APPARATUS FOR PREDICTING TEST SCORES

(71) Applicant: Socra AI Inc., Seoul (KR)

(72) Inventor: Han Gyeol Yu, Seoul (KR)

(73) Assignee: Socra AI Inc., Seoul (KR)

( * ) Notice: Subject to any disclaimer, the term of this patent is extended or adjusted under 35 U.S.C. 154(b) by 968 days.

(21) Appl. No.: 17/869,375

(22) Filed: Jul. 20, 2022

(65) Prior Publication Data

US 2023/0024169 A1 Jan. 26, 2023

(30) Foreign Application Priority Data

Jul. 23, 2021 (KR) ........................ 10-2021-0096804

(51) Int. Cl.
*G09B 7/02* (2006.01)
*G06Q 10/10* (2023.01)
*G06Q 50/20* (2012.01)

(52) U.S. Cl.
CPC ............... *G09B 7/02* (2013.01); *G06Q 10/10* (2013.01); *G06Q 50/20* (2013.01)

(58) Field of Classification Search
CPC ........... G09B 7/02; G06Q 10/10; G06Q 50/20
See application file for complete search history.

(56) References Cited

FOREIGN PATENT DOCUMENTS

| | | | | | |
|---|---|---|---|---|---|
| CN | 110751261 A | * | 2/2020 | ............. G06N 3/045 |
| CN | 111402659 A | * | 7/2020 | ............... G09B 7/06 |
| KR | 10-2194837 B1 | | 12/2020 | |
| KR | 10-2213476 B1 | | 2/2021 | |
| KR | 10-2213478 B1 | | 2/2021 | |

OTHER PUBLICATIONS

Translation—CN110751261A, Luo et al., 2020 (Year: 2020).*
Translation—CN111402659A, Jiang Guangxian, 2020 (Year: 2020).*

* cited by examiner

*Primary Examiner* — Jay Trent Liddle
*Assistant Examiner* — Jose Angeles
(74) *Attorney, Agent, or Firm* — USX IP LLC

(57) ABSTRACT

A method for predicting a test score of a user through an artificial intelligence model by a terminal, includes: delivering training data of the user to a first layer for embedding; embedding the training data through the first layer; delivering an embedding vector from the first layer to a second layer including a compressive transformer; delivering an output value from the second layer to a third layer for predicting the test score; and outputting a prediction value for predicting the test score from the third layer.

7 Claims, 5 Drawing Sheets

| | | | | | | |
|---|---|---|---|---|---|---|
| $q_1$ | $q_2$ | $q_3$ | . . . | $q_{t-1}$ | $q_t$ | |
| | $a_1$ | $a_2$ | . . . | $a_{t-2}$ | $a_{t-1}$ | $a_t$ |

METHOD AND APPARATUS FOR PREDICTING TEST SCORES

BACKGROUND OF THE INVENTION

Field of the Invention

The present specification relates to a method and an apparatus for predicting test scores of a user by a terminal using artificial intelligence.

Description of the Related Art

As a deep learning model for transformer series natural language processing (NLP), there are representatively a transformer model, BERT (Bidirectional Encoder Representations from Transformers), transformer XL, a compressive transformer, and the like. In addition, as a knowledge tracing (KT) model, there are SAINT, DKT (Deep Knowledge Tracing), SAKT (Self-Attentive model for Knowledge Tracing), and the like.

In a transformer series score prediction model, an operation cost proportional to a square of a length of input time series data may occur. Accordingly, in order to provide a stable service to a customer, general transformer series score prediction models were limited to reading only 100 question-solving records. However, since the 100 question-solving records are small data which are consumed within one hour on average by a user, it is insufficient to understand the overall learning level of the user.

SUMMARY OF THE INVENTION

An object of the present specification is to effectively analyze long learning records of a user by using a compressive transformer.

In addition, another object of the present specification is to propose technology of modeling unique information of a user by tracing stored data of the user by using a compressive transformer.

The technical problems to be achieved by the present specification are not limited to the technical problems mentioned above, and other technical problems not mentioned are clear to those of ordinary skill in the art to which the present specification belongs from the detailed description of the following specification.

According to an aspect of the present specification, there is provided a method for predicting a test score of a user through an artificial intelligence model by a terminal, including: a step of delivering training data of the user to a first layer for embedding; a step of embedding the training data through the first layer; a step of delivering an embedding vector from the first layer to a second layer including a compressive transformer; a step of delivering an output value from the second layer to a third layer for predicting the test score; and a step of outputting a prediction value for predicting the test score from the third layer.

In addition, the training data may be configured with sets of pairs of questions and correct answers of the user about the questions, the embedding vector may be created on the basis of the following equation: $x_n=E_q(q_n)+E_a(a_{n-1})$, and the $x_n$ may mean an n-th embedding vector, the $E_q$ may mean an embedding layer related to the question, $E_a$ may mean an embedding layer related to the correct answer, $q_n$ may mean an n-th question, and $a_{n-1}$ may mean a (n−1)-th correct answer.

In addition, the second layer may include an attention mask matrix, and the attention mask matrix may be an upper triangular matrix.

In addition, a pre-training model for the artificial intelligence model may use, at a specific time point, only data created before the specific time point on the basis of the upper triangular matrix to perform pre-training.

According to another aspect of the present specification, there is provided a terminal which predicts a test score of a user through an artificial intelligence model, including: a memory which includes the artificial model; and a processor which functionally controls the memory, wherein the processor delivers training data of the user to a first layer for embedding, embeds the training data through the first layer, delivers an embedding vector from the first layer to a second layer including a compressive transformer, delivers an output value from the second layer to a third layer for predicting the test score, and outputs a prediction value for predicting the test score.

Figure 1:
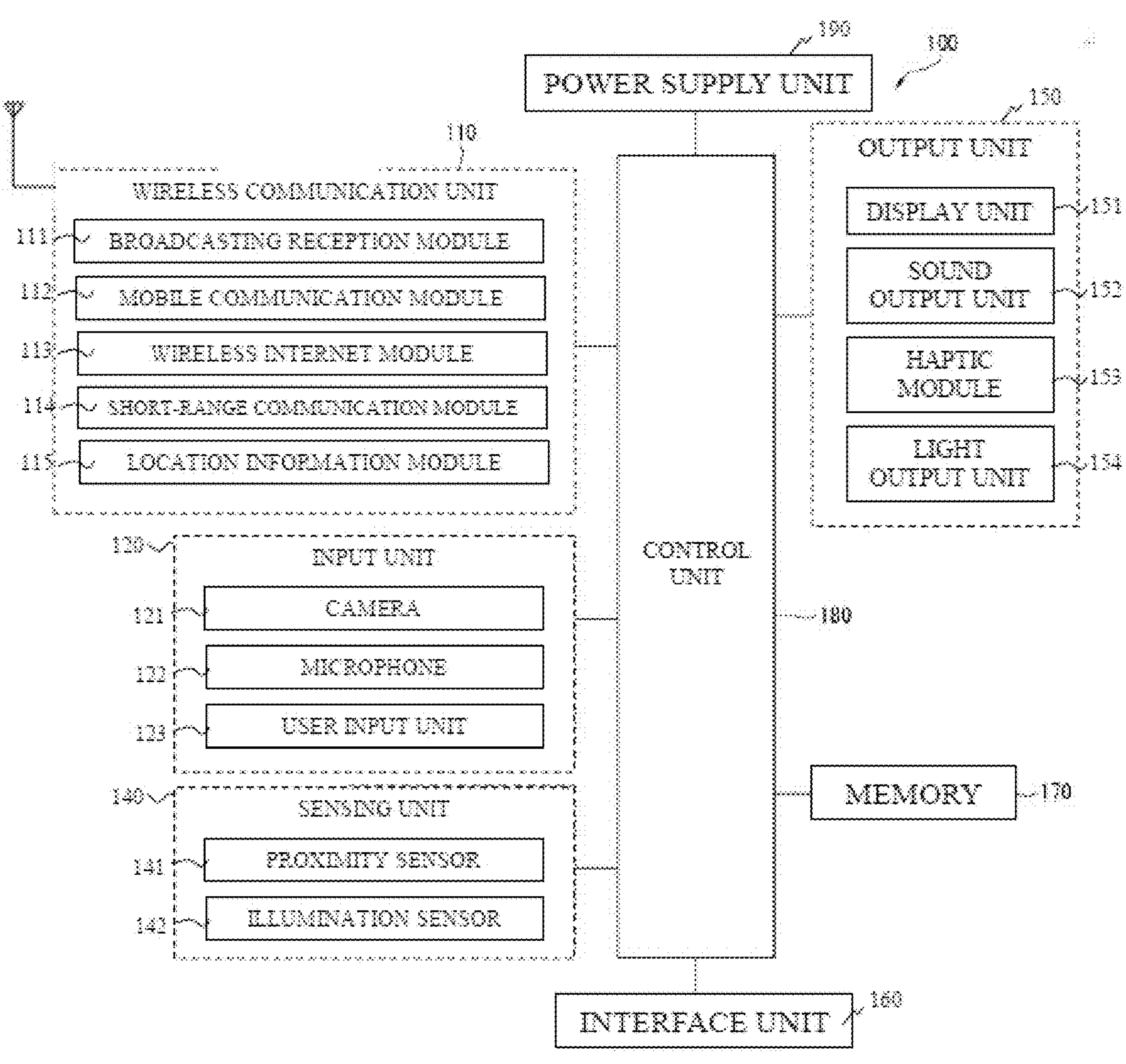
FIG. 1 is a block diagram illustrating an electronic apparatus according to the present specification.

The accompanying drawings, which are included as a part of the detailed description to help the understanding of the present specification, provide embodiments of the present specification, and together with the detailed description, explain the technical features of the present specification.

DETAILED DESCRIPTION OF THE PREFERRED EMBODIMENTS

Hereinafter, the embodiments disclosed in the present specification will be described in detail with reference to the accompanying drawings, but the same or similar components are assigned the same reference numbers regardless of reference numerals, and redundant description thereof will be omitted. The suffixes "module" and "unit" for the components used in the following description are given or mixed in consideration of only the ease of writing the specification, and do not have distinct meanings or roles by themselves. In addition, in describing the embodiments disclosed in the present specification, if it is determined that detailed descriptions of related known technologies may obscure the gist of the embodiments disclosed in the present specification, the detailed description thereof will be omitted. In addition, the accompanying drawings are only for easy understanding of the embodiments disclosed in the present specification, and the technical idea disclosed in the present specification is not limited by the accompanying drawings, and should be understood to include all changes, equivalents, or substitutes included in the spirit and scope of the present specification.

Terms including an ordinal number, such as first, second, etc., may be used to describe various components, but the components are not limited by the terms. The above terms are used only for the purpose of distinguishing one component from another.

When a certain component is referred to as being "connected" or "linked" to another component, it may be directly connected or linked to the other component, but it should be understood that other components may exist in between. On the other hand, when it is mentioned that a certain component is "directly connected" or "directly linked" to another component, it should be understood that no other component exist in between.

The singular expression includes the plural expression unless the context clearly dictates otherwise.

In the present application, terms such as "include" or "have" are intended to designate that the features, numbers, steps, operations, components, parts, or combinations thereof described in the specification exist, but it should be understood that the possibility of presence or addition of one or more other features, numbers, steps, operations, components, parts, or combinations thereof is not excluded.

FIG. 1 is a block diagram illustrating an electronic apparatus according to the present specification.

The electronic apparatus 100 may include a wireless communication unit 110, an input unit 120, a sensing unit 140, an output unit 150, an interface unit 160, a memory 170, a control unit 180, a power supply unit 190, and the like. The components illustrated in FIG. 1 are not essential in implementing the electronic apparatus, and the electronic apparatus described in the present specification may have more or fewer components than the components listed above.

More specifically, the wireless communication unit 110 of the components may include one or more modules which enable wireless communication between the electronic apparatus 100 and a wireless communication system, between the electronic apparatus 100 and another electronic apparatus 100, or between the electronic apparatus 100 and an external server. In addition, the wireless communication unit 110 may include one or more modules which connect the electronic apparatus 100 to one or more networks.

Such a wireless communication unit 110 may include at least one of a broadcasting reception module 111, a mobile communication module 112, a wireless internet module 113, a short-range communication module 114, and a location information module 115.

The input unit 120 may include a camera 121 or an image input unit for inputting an image signal, a microphone 122 or an audio input unit for inputting an audio signal, and a user input unit 123 (e.g., touch key, push key (mechanical key), etc.) for receiving information from a user. Voice data or image data collected by the input unit 120 may be analyzed and processed by a control command of a user.

The sensing unit 140 may include one or more sensors for sensing at least one of information in the electronic apparatus, surrounding environment information around the electronic apparatus, and user information. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared sensor (IR sensor), a finger scan sensor, an ultrasonic sensor, an optical sensor (e.g., camera 121), a microphone 122, a battery gauge, an environment sensor (e.g., barometer, hygrometer, thermometer, radiation detection sensor, heat detection sensor, and gas detection sensor), and a chemical sensor (e.g., electronic nose, healthcare sensor, and biometric sensor). Meanwhile, the electronic apparatus disclosed in the present may utilize combination of information sensed by at least two sensors of such sensors.

The output unit 150 is to generate an output related to sight, hearing, touch, or the like, and may include at least one of a display unit 151, a sound output unit 152, a haptic module 153, and a light output unit 154. The display unit 151 has an inter-layer structure with a touch sensor or is formed integrally, thereby implementing a touch screen. Such a touch screen may serve as a user input unit 123 providing an input interface between the electronic apparatus 100 and a user, and may provide an output interface between the electronic apparatus 100 and the user.

The interface unit 160 serves as a passage with various kinds of external apparatus connected to the electronic apparatus 100. Such an interface unit 160 may include at least one of a wired/wireless headset port, an external charger port, a wired/wireless data port, a memory card port, a port connecting a device provided with an identification module, an audio I/O (Input/Output) port, a video I/O (Input/Output) port, and an earphone port. The electronic apparatus 100 may perform a proper control related to a connected external apparatus in response to connecting an external apparatus to the interface unit 160.

In addition, the memory 170 stores data supporting various functions of the electronic apparatus 100. The memory 170 may store a number of programs (application program or application) running in the electronic apparatus 100, data for operation of the electronic apparatus 100, and commands. At least a part of such application programs may be downloaded from an external server through wireless communication. In addition, at least a part of such application programs may exist on the electronic apparatus 100 from the time of shipment for basic functions (e.g., call receiving and sending functions, and message receiving and sending functions) of the electronic apparatus 100. Meanwhile, the application programs may be stored in the memory 170, installed on the electronic apparatus 100, and driven to perform operations (or functions) of the electronic apparatus by the control unit 180.

In addition to the operations related to the application programs, the control unit 180 generally controls overall operations of the electronic apparatus 100. The control unit 180 may provide or process appropriate information or functions to a user by processing signals, data, information, and the like input or output through the components described above or running the application programs stored in the memory 170.

In addition, the control unit 180 may control at least a part of the components described with reference to FIG. 1 to run the application programs stored in the memory 170. Furthermore, in order to run the application programs, the control unit 180 may operate at least two components included in the electronic apparatus 100 in combination with each other.

The power supply unit 190 receives external power and internal power and supplies power to each component included in the electronic apparatus 100 under the control of the control unit 180. Such a power supply unit 190 may include a battery, and the battery may be a built-in battery or a replaceable battery.

At least a part of the components may be operated cooperatively with each other to implement an operation, control, or control method of the electronic apparatus according to various embodiments described hereinafter. In addition, the operation, control, or control method of the electronic apparatus may be implemented on the electronic apparatus by running at least one application program stored in the memory 170.

In the present specification, the electronic apparatus 100 may be collectively referred to as a terminal.

Figure 2:
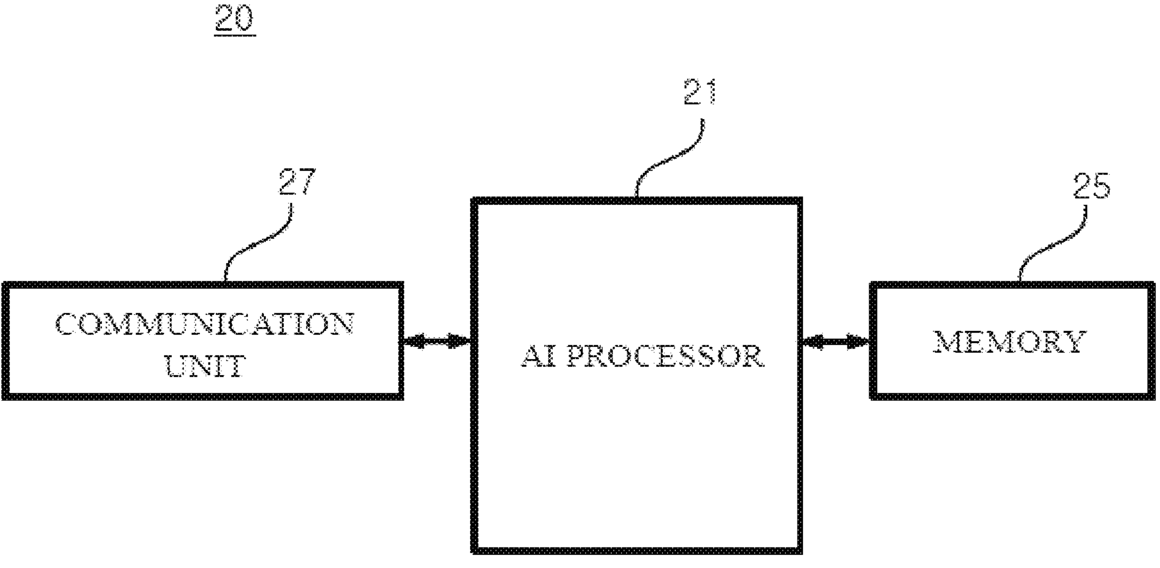
FIG. 2 is a block diagram illustrating an AI device according to an embodiment of the present specification.

FIG. 2 is a block diagram illustrating an AI device according to an embodiment of the present specification.

The AI device 20 may include an electronic apparatus including an AI module capable of AI processing or a server including the AI module. In addition, the AI device 20 may be included as at least a part of the composition of the electronic apparatus 100 illustrated in FIG. 1, and perform at least a part of the AI processing together.

The AI device 20 may include an AI processor 21, a memory 25, and/or a communication unit 27.

The AI device 20 is a computing device capable of training a neural network and may be implemented by various electronic device such as a server, a desktop PC, a laptop PC, and a tablet PC.

The AI processor 21 may train an AI model by using a program stored in the memory 25. Particularly, the AI processor 21 may train the AI model to predict a test score of a user.

Meanwhile, the AI processor 21 performing the functions described above may be a general purpose processor (e.g., CPU), but may be an AI dedicated processor (e.g., GPU) for artificial intelligence learning.

The memory 25 may store various kinds of programs and data necessary for operation of the AI device 20. The memory 25 may be implemented by a non-volatile memory, a volatile memory, a flash memory, a hard disk drive (HDD), a solid state drive (SSD), and the like. The memory 25 may be accessed by the AI processor 21, and the AI processor 21 may perform reading, recording, modifying, deleting, updating, and the like of data. In addition, the memory 25 may store a neural network model (e.g., deep learning model) created through a learning algorithm for data classification/recognition according to an embodiment of the present specification.

Meanwhile, the AI processor 21 may include a data learning unit which trains a neural network for data classification/recognition. For example, the data learning unit may acquire training data to be used for learning, and apply the acquired training data to a deep learning model, thereby training the deep learning model.

The communication unit 27 may transmit an AI processing result of the AI processor 21 to an external electronic apparatus.

Herein, the external electronic apparatus may include another terminal and server.

Meanwhile, the AI device 20 illustrated in FIG. 2 has been functionally divided into the AI processor 21, the memory 25, the communication unit 27, and the like, but the components described above may be integrated into one module and may be referred to as an AI module.

More specifically, the terminal may employ a knowledge tracing (KT) model as a pre-training model of the above-described AI model. For example, the KT model is a model which performs a task of predicting correct and wrong answers about an unseen question by utilizing the past education record of a specific student by using AI.

When pre-training is performed through a bi-directional transformer network, a pre-training model may use both past and future training information. However, the actual demand for education services is focused on analyzing the present state or predicting future behavior using past data. Since the pre-training model adopts the KT model in the present specification, when predicting the user's correct answer at a specific time point, it is required to limit the use of input data after the specific time point.

Accordingly, a matrix for a square-shaped attention mask used in the pre-training model to prevent the terminal from using data in a future position may be implemented as an upper triangular matrix.

Figure 3:
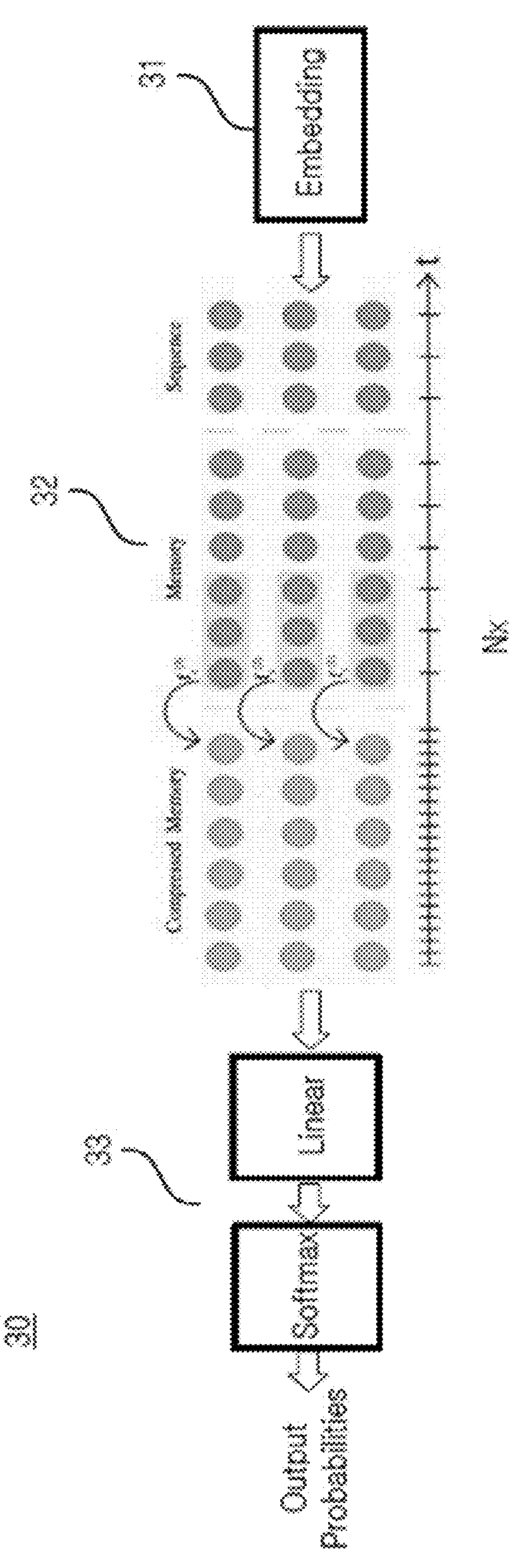
FIG. 3 is a diagram illustrating an example of a score prediction model architecture according to the present specification.

FIG. 3 is a diagram illustrating an example of a score prediction model architecture according to the present specification.

Referring to FIG. 3, the terminal may create a score prediction model 30 by using a pre-training model in which pre-training has been completed. The score prediction model 30 includes an embedding layer 31, a core network 32, and a prediction layer 33.

Generally, in order to create a model performing an original task, in the pre-training model, all parameters from an embedding layer to a prediction layer are newly tuned.

However, in the score prediction model 30 in the present specification, all parameters of layers except the prediction layer of the pre-training model are fixed. The score prediction model 30 created through such a tuning method exhibits performance better than score prediction models created through other tuning methods.

A core structure of a general score prediction model is a traditional transformer encoder. In the present specification, a core network of the score prediction model 30 includes a compressive transformer 32.

The compressive transformer is a variant of a transformer, and may effectively process long time series data through a unique compression function. For example, when the compressive transformer is used in the field of natural language processing, it has been proven to have an advantageous effect in learning meta information such as a character's disposition in a long text such as a novel.

Again, referring to FIG. 3, the compressive transformer 32 may have a unit length set to 3. Through the compressive transformer 32, the terminal may divide an input sequence by a unit length, and then sequentially process them from the first fragment. When a new fragment is allocated, the terminal may move the previous fragment to the memory. If the memory is saturated, the terminal may compress the fragments from the oldest fragment in the memory by a specific ratio, and move the compressed fragments to a compressed memory. When the compressed memory is full, the oldest information of the compressed memory is discarded. The terminal may join the input and stored sequence, the memory, and the compressed memory to configure one new input sequence, and input the sequence to the existing transformer encoder, thereby performing self-attention.

Figure 4:
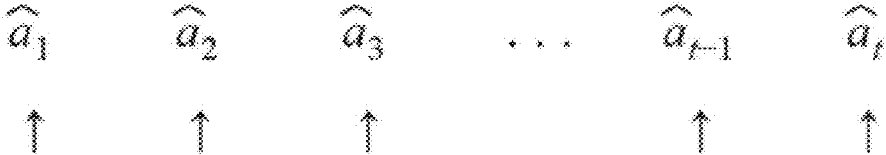
FIG. 4 is a diagram illustrating an example of an embedding method according to the present specification.

FIG. 4 is a diagram illustrating an example of an embedding method according to the present specification.

Embedding is digitization (vectorization) of language (e.g., natural language) used by a user so that a machine can understand it, and the embedding may be representatively used to calculate similarity between words or sentences in natural language processing. The terminal may perform embedding about input data through the embedding layer 31.

Referring to FIG. 4, it may be assumed that a training record of a user was provided as time series data as represented in Equation 1.

$$(q_1,a_1),(q_2,a_2),(q_3,a_3), \ldots ,(Q_t,a_t) \quad \text{[Equation 1]}$$

Referring to Equation 1, $q_n$ indicates n-th question data, and $a_n$ indicates whether the user answers the n-th question correctly. The score prediction model 30 may have a task of predicting $a_n$ by using data up to n−1 and $q_n$. More specifically, the number of input question data is one more than the number of data on whether the user answers the question correctly.

Equation 2 is an example of an embedding structure of the score prediction model 30.

$$x_n=E_q(q_n)+E_a(a_{n-1}) \quad \text{[Equation 2]}$$

Referring to Equation 2, the terminal may transform $q_n$ and $a_n$ to $E_q(q_n)$, $E_a(a_n)$ through $E_q$, $E_a$ included in the embedding layer 31. The n-th final embedding vector $x_n$ may be calculated by the sum of the n-th question embedding $E_q(q_n)$ and the previous correct answer embedding $E_a(a_{n-1})$.

More specifically, an embedding method of general KT models may be as Equation 3 below.

$$x_n=E(q_n,a_n) \quad \text{[Equation 3]}$$

Referring to FIG. 3, when it is predicted whether $a_n$ a user answers the n-th question $q_n$ correctly by using the existing embedding method, the $q_n$ must be coupled with the $a_n$ in the embedding step. However, the $a_n$ representing whether the user answers the n-th final question correctly is not information which can be provided in advance. Accordingly, when the prediction is performed through the existing KT model, it is impossible to input the embedding of the $q_n$ to the transformer encoder. Accordingly, generally, the KT model using the embedding as represented in Equation 3 may be trained to return correct answer probability about all target questions and then to selectively use only an output about the $q_n$.

Referring to FIG. 4 again, when the embedding method of the present specification is utilized, the $q_n$ is coupled with $a_{n-1}$, and thus may be input to the transformer encoder from the beginning. Through this, the attention of the transformer may be directly utilized up to the information of the last question $q_n$.

In addition, since the prediction layer 33 of the present specification only needs to return only one of a small number of prediction values instead of prediction value vectors about all questions, it is possible to save the memory and time.

Figure 5:
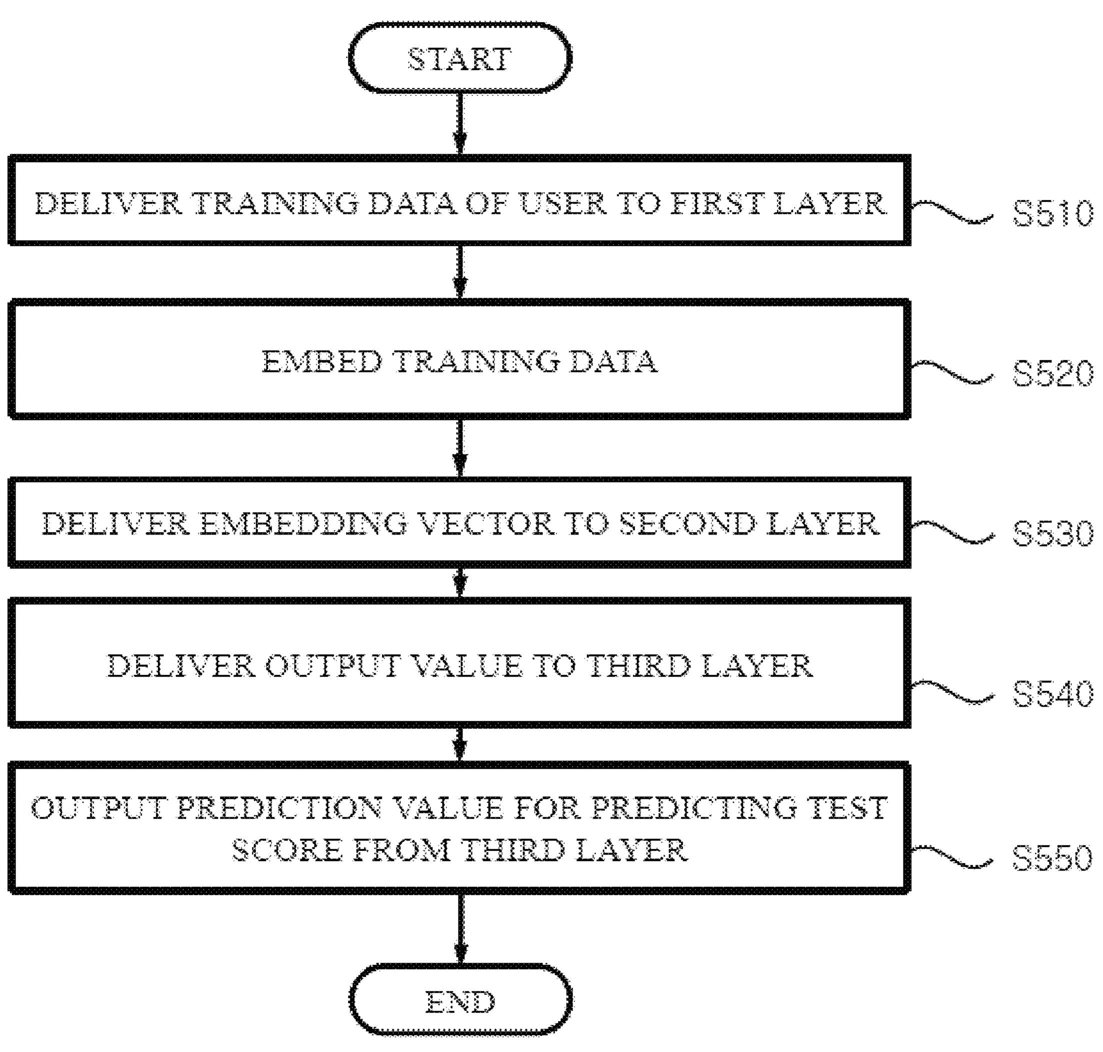
FIG. 5 is a diagram illustrating an embodiment of a terminal according to the present specification.

FIG. 5 is a diagram illustrating an embodiment of a terminal according to the present specification.

Referring to FIG. 5, the terminal may include the score prediction model 30. The terminal may predict a test score of a user by using the score prediction model 30. The score prediction model 30 may be a model on which pre-training has been performed. For example, an attention mask matrix of a pre-training model for the score prediction model 30 may be configured as an upper triangular matrix. More specifically, the pre-training model may perform a task for pre-training at a specific time point through the upper triangular matrix by using only data generated before the specific time point without using data generated after the specific time point.

The terminal delivers the training data of the user to a first layer (S510). For example, the first layer may include the embedding layer 31. Herein, the training data may be configured with sets of pairs of questions and correct answers of the user about the questions.

The terminal embeds the training data through the first layer (S520).

The terminal delivers an embedding vector from the first layer to a second layer including a compressive transformer (S530). For example, the second layer may include a core network 32. The second layer may include an upper triangular matrix as an attention mask matrix on the basis of a pre-training model.

The embedding vector may be created on the basis of the following equation: $x_n=E_q(q_n)+E_a(a_{n-1})$, and the $x_n$ may mean an n-th embedding vector, the $E_q$ may mean an embedding layer related to the question, $E_a$ may mean an embedding layer related to the correct answer, $q_n$ may mean an n-th question, and $a_{n-1}$ may mean a (n−1)-th correct answer.

The terminal delivers an output value from the second layer to a third layer for predicting the test score (S540). For example, the third layer may include a prediction layer 33.

The terminal outputs a prediction value for predicting the test score from the third layer (S550). The third layer may receive the output value and predict a test score of the user.

The above-described present specification may be implemented as a computer-readable code on a program-recorded medium. The computer-readable medium includes all kinds of recording devices which store data readable by a computer system. Examples of the computer-readable medium are an HDD (Hard Disk Drive), an SSD (Solid State Disk), an SDD (Silicon Disk Drive), a ROM, a RAM, a CD-ROM, a magnetic tape, a floppy disk, an optical data storage device, and the like, and also include what is implemented in a form of carrier wave (e.g., transmission through internet). Accordingly, the above detailed description should not be construed as restrictive in all respects and should be considered as exemplary. The scope of the present specification should be determined by a reasonable interpretation of the appended claims, and all modifications within the equivalent scope of the present specification are included in the scope of the present specification.

In addition, although the above description has been focused on services and embodiments, this is merely an example and does not limit the present specification, and those of ordinary skill in the art can know that various modifications and application not exemplified in the above description are possible in the scope not depart from the essential characteristics of the present service and embodiments. For example, each component specifically represented in the embodiments may be modified and implemented. In addition, differences related to such modifications and applications should be construed as being included in the scope of the present specification defined in the appended claims.

According to the embodiment of the present specification, it is possible to effectively analyze long learning records of a user by using the compressive transformer.

In addition, according to the embodiment of the present specification, it is possible to model unique information of a user by tracking stored data of a user by using the compressive transformer.

The effects obtainable in the present specification are not limited to the above-mentioned effects, and other effects not mentioned will be clearly understood by those of ordinary skill in the art to which the present specification belongs from the description below.

What is claimed is:

1. A method for predicting a test score of a user through an artificial intelligence (AI) model by a terminal, the method comprising:

generating the AI model by using a pre-training model in which pre-training has been completed, wherein the AI model includes an embedding layer, a core network, and a prediction layer, and the core network includes a compressive transformer configured to process time series data through a compression function, wherein the generating of the AI model includes tuning the pre-training model with all parameters of layers of the pre-training model except a prediction layer of the pre-training model being fixed;

delivering training data of the user to the embedding layer for embedding;

embedding the training data through the embedding layer;

delivering an embedding vector from the embedding layer to the core network including the compressive transformer;

delivering an output value from the core network to the prediction layer for predicting the test score; and outputting a prediction value for predicting the test score from the prediction layer, wherein the training data are configured with a set of pairs containing questions and whether the user answered the questions correctly, wherein the embedding vector is created based on a following equation:

$$x_n = E_q(q_n) + E_a(a_{n-1}),\text{ and}$$

wherein the $x_n$ means an n-th question, wherein the $q_n$ means an n-th embedding vector, the and the $a_{n-1}$ means the user answered a (n−1)-th question correctly, the $E_q$ means an embedding layer related to a question, and $E_a$ means an embedding layer related to whether the user answered the question correctly, wherein the delivering of the output value from the core network to the prediction layer comprises:

inputting an input sequence corresponding to the embedding vector to the core network, dividing the input sequence by a unit length set to the compressive transformer, sequentially processing fragments of the divided input sequence, starting from a first fragment, by using the compressive transformer, based on a new fragment being allocated to the compressive transformer, moving a previously processed fragment to a memory, and based on the memory being saturated, compressing fragments from an oldest fragment in the memory according to a specific ratio and moving the compressed fragments to a compressed memory.

2. The method according to claim 1, wherein the core network includes an attention mask matrix, and wherein the attention mask matrix is an upper triangular matrix.

3. The method according to claim 2, wherein the pre-training model for the AI model uses, at a specific time point, only data created before the specific time point based on the upper triangular matrix to perform pre-training.

4. A non-transitory computer-readable recording medium storing a computer program to perform the method of claim 1 in combination with hardware.

5. A terminal which predicts a test score of a user through an artificial intelligence (AI) model, the terminal comprising:

a memory which includes the AI model; and a processor which functionally controls the memory, wherein the processor is configured to:

generate the AI model by using a pre-training model in which pre-training has been completed, wherein the AI model includes an embedding layer, a core network, and a prediction layer, and the core network includes a compressive transformer configured to process time series data through a compression function, wherein the generating of the AI model includes tuning the pre-training model with all parameters of layers of the pre-training model except a prediction layer of the pre-training model being fixed, deliver training data of the user to the embedding layer for embedding, embed the training data through the embedding layer, deliver an embedding vector from the embedding layer to the core network including the compressive transformer, deliver an output value from the core network to the prediction layer for predicting the test score, and output a prediction value for predicting the test score, wherein the training data are configured with a set of pairs containing questions and whether the user answered the questions correctly, wherein the embedding vector is created based on a following equation:

$$x_n = E_q(q_n) + E_a(a_{n-1})$$

wherein the $x_n$ means an n-th embedding vector, the $q_n$ means an n-th question, and the $a_{n-1}$ means the user answered a (n−1)-th question correctly, the $E_q$ means an embedding layer related to a question, and $E_a$ means an embedding layer related to whether the user answered the question correctly, wherein the processor is further configured to:

input an input sequence corresponding to the embedding vector to the core network, divide the input sequence by a unit length set to the compressive transformer, sequentially process fragments of the divided input sequence, starting from a first fragment, by using the compressive transformer, based on a new fragment being allocated to the compressive transformer, move a previously processed fragment to a memory, and based on the memory being saturated, compress fragments from an oldest fragment in the memory according to a specific ratio and move the compressed fragments to a compressed memory.

6. The terminal according to claim 5, wherein the core network includes an attention mask matrix, and wherein the attention mask matrix is an upper triangular matrix.

7. The terminal according to claim 6, wherein the pre-training model for the AI model uses, at a specific time point, only data created before the specific time point based on the upper triangular matrix to perform pre-training.

* * * * *